(12) United States Patent
Neulander (10) Patent No.: US 9,842,416 B2
(45) Date of Patent: Dec. 12, 2017

(54) ANIMATED PAINTERLY PICTURE GENERATION

(71) Applicant: Google Inc., Mountain View, CA (US)

(72) Inventor: Ivan Neulander, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/704,959

(22) Filed: May 5, 2015

(65) Prior Publication Data

US 2016/0328866 A1 Nov. 10, 2016

(51) Int. Cl.
*G06T 11/20* (2006.01)
*B44F 11/02* (2006.01)
*G06K 9/00* (2006.01)
*G06T 11/00* (2006.01)
*G06T 13/80* (2011.01)

(52) U.S. Cl.
CPC .............. *G06T 11/20* (2013.01); *B44F 11/02* (2013.01); *G06K 9/00* (2013.01); *G06K 9/00221* (2013.01); *G06T 11/001* (2013.01); *G06T 13/80* (2013.01); *G06T 2207/10004* (2013.01); *G06T 2207/30201* (2013.01)

(58) Field of Classification Search
CPC ....................................................... G06T 11/20
USPC ......................................................... 345/441
See application file for complete search history.

(56) References Cited

U.S. PATENT DOCUMENTS

| 7,043,080 B1 * | 5/2006 | Dolan | G06K 9/00456 358/3.13 |
| 2003/0095709 A1 * | 5/2003 | Zhou | G06T 7/0083 382/190 |
| 2004/0205483 A1 | 10/2004 | Massarsky | |
| 2010/0134492 A1 * | 6/2010 | Ford | G06T 15/80 345/426 |
| 2011/0175916 A1 * | 7/2011 | Noris | G06K 9/481 345/441 |
| 2011/0187732 A1 * | 8/2011 | Odagiri | G06T 11/40 345/582 |
| 2012/0133664 A1 * | 5/2012 | Zhu | G06T 11/001 345/582 |

(Continued)

FOREIGN PATENT DOCUMENTS

EP     0916994     5/1999

OTHER PUBLICATIONS

"Animating Chinese paintings through stroke-based decomposition" Songhua Xu, Yingqing Xu, Sing Bing Kang, David H. Salesin, Yunhe Pan, Heung-Yeung Shum Mar. 2006 ACM Transactions on Graphics (TOG): vol. 25 Issue 2, Apr. 2006.*

(Continued)

*Primary Examiner* — Javid A Amini
(74) *Attorney, Agent, or Firm* — Patent Law Works LLP (57) ABSTRACT

A system for animated painterly picture generation comprises a processor and a memory storing instructions that, when executed, cause the system to: determine a first set of brush strokes, each brush stroke being based on a two-dimensional vector; generate a first frame from the first set of brush strokes; perturb the first set of brush strokes to create additional sets of brush strokes; and generate additional frames from the additional sets of brush strokes, wherein the first frame and the additional frames form a sequence of frames that are time-coherent.

18 Claims, 8 Drawing Sheets (56) References Cited

U.S. PATENT DOCUMENTS

| 2012/0301050 | A1* | 11/2012 | Wakazono | H04N 5/23229 382/274 |
|---|---|---|---|---|
| 2013/0021627 | A1* | 1/2013 | Murata | B41F 17/00 358/1.9 |
| 2013/0028523 | A1* | 1/2013 | Yokoyama | G06T 7/0083 382/199 |
| 2013/0077869 | A1* | 3/2013 | Teshima | G06T 11/001 382/195 |
| 2013/0127823 | A1* | 5/2013 | Diverdi | G06T 17/10 345/419 |
| 2013/0315500 | A1* | 11/2013 | Ebihara | G06T 5/003 382/264 |
| 2014/0233849 | A1* | 8/2014 | Weng | G06K 9/00281 382/154 |
| 2016/0162114 | A1* | 6/2016 | Fu | G06F 3/0418 345/178 |

OTHER PUBLICATIONS

Collomosse, J. P., Hall, P. M.: Painterly rendering using image salienc. In: Proc. of Eurographics UK Comf., pp. 122-128 (2002).*

Chen, G., et al., "Design of 2D Time-Varying Vector Fields," IEEE Transactions on Visualization and Computer Graphics, IEEE Service Center, Los Alamitos, CA, US, vol. 18, No. 10, Oct. 1, 2012, pp. 1717-1730.

Chi et al., "A details enhancement rendering method for pointillism," The 2014 7th International Congress on Image and Signal Processing, IEEE, Oct. 14, 2014, pp. 442-446.

Dev et al., "Layered mixed media painting," International Conference on Computer & Communication Technology, IEEE, Piscataway, NJ, US, Sep. 17, 2010, pp. 242-247.

Hays, J., et al., "Image and Video Based Painterly Animation," Proceedings NPAR 2004, 3rd. International Symposium on Non-Photorealistic Animation and Rendering. Anney, France, Jun. 7-9, 2004; [Symposium on Non-Photorealistic Animation and Rendering], New York, NY: ACM, US, Jun. 7, 2004, pp. 113-120.

Hertzmann, A., "A survey of stroke-based rendering," IEEE Computer Graphics and Applications, IEEE Service Center, New York, NY, US, vol. 23, No. 4, Jul. 1, 2003, pp. 70-81.

Hertzmann, A., "Paint by Relaxation," Computer Graphics International 2001, Proceedings Jul. 3-6, 2001, Piscataway, NJ, USA, IEEE, Jul. 3, 2001, pp. 47-54.

Hertzmann, A., "Stroke-Based Rendering," Jan. 1, 2003, retrieved from Internet, http://web.cs.ucdavis.edu/~ma/SIGGRAPH02/course23/notes/S02c23_3.pdf.

International Search Report and Written Opinion for International application No. PCT/US2016/021963, dated Jul. 13, 2016.

Kagaya, M., et al., "Video Painting with Space-Time-Varying Style Parameters," IEEE Transactions on Visualization and Computer Graphics, IEEE Service Center, Los Alamitos, CA, US., vol. 17, No. 1, Jan. 1, 2011, pp. 74-87.

Lee et al., "Brushstroke Control from Image Saliency," Ninth IEEE International Symposium on Parallel and Distributed Processing with Applications Workshops, IEEE, May 26, 2011, pp. 55-60.

Li et al., "Contour extraction improved by gradient saliency detection," 2012 5th International Congress on Image and Signal Processing, IEEE, Oct. 16, 2012, pp. 852-855.

Scherzer et al., "Temporal Coherence Methods in Real-Time Rendering," Computer Graphics Forum, Wiley-Blackwell Publishing Ltd., GB, vol. 31, No. 8, Jan. 1, 2012, pp. 2378-2408.

* cited by examiner

ANIMATED PAINTERLY PICTURE GENERATION

TECHNICAL FIELD

The present disclosure relates to computer generated images. More specifically, the present disclosure relates to computer generated painterly animations.

BACKGROUND

Computer applications are sometimes used to create images in a variety of endeavors such as film, video games, simulators and art. Computer applications can generate still images or video and may do so in 2D and 3D. While some systems create such computer imagery based on data structures defining a virtual word, other systems transform existing images into new images.

Some systems transform photographic images into painterly pictures that resemble artistically rendered paintings. With the popularity of smart phones with cameras and an ever increasing use of the Internet, social networks and other media sharing systems, there is an increased desire for photographic manipulation and transformation.

SUMMARY

The present disclosure relates to systems and methods for automatically generating painterly pictures. According to one innovative aspect of the subject matter in this disclosure, a system for animated painterly picture generation comprises a processor and a memory storing instructions that, when executed, cause the system to: determine a first set of brush strokes, each brush strokes being based on a two-dimensional vector; generate a first frame from the first set of brush strokes; perturb the first set of brush strokes to create additional sets of brush strokes; and generate additional frames from the additional sets of brush strokes, wherein the first frame, and the additional frames form a sequence of frames that are time-coherent.

In general, another innovative aspect of the subject matter described in this disclosure may be implemented in methods that include determining, using one or more processors, a first set of brush strokes, each brush stroke being based on a two-dimensional vector; generating, using one or more processors, a first frame from the first set of brush strokes; perturbing, using one or more processors, the first set of brush strokes to create additional sets of brush strokes; and generating, using one or more processors, additional frames from the additional sets of brush strokes, wherein the first frame, and the additional frames form a sequence of frames that are time-coherent.

Other implementations of one or more of these aspects include corresponding systems, apparatus, and computer programs, configured to perform the actions of the methods, encoded on computer storage devices.

These and other implementations may each optionally include one or more of the following features. For example, features may include the brush strokes being formed during a uniform layer and a detail layer. The uniform layer may be based on a sampling of underlying pixel values in an input image. The detail layer may be based on a determined saliency map. The saliency map may be based on areas of facial recognition within the input image. The saliency map may be based on a gradient image of the input image. The perturbations of the brush strokes in the generated sequence of frames may form a periodic motion. The periodic motion may be based on a sinusoidal function. The periodic motion may be based on a Lissajous curve. The uniform layer of brush strokes may be based on a random or quasi-random algorithm. The sizes and outlines of the uniform layer brush strokes are jittered using a low-discrepancy sequence. The brush strokes are added to the priority queue. The priority queue may be sorted and the brush strokes in the priority queue may be placed on a canvas. In some instances, a brush stroke's perturbation radius (the maximum distance it can move from its nominal location) is a function of the brush stroke's size, which, in turn, may vary inversely with image detail as conveyed by the saliency map. This property helps to preserve the overall detail of the painterly picture by avoiding localized blurring or degradation of detail by unreasonably large droplet perturbations in regions of high saliency.

These implementations are particularly advantageous in a number of respects. For instance, a visually pleasing animation may be created from a single still input image. Moreover, regions between high and low detail transition smoothly from detailed to uniform brush strokes in a natural way. Further, the animation is time coherent and has a level of cognitive complexity.

It should be understood, however, that the above features and advantages are not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation, in the figures of the accompanying drawings in which like reference numerals are used to refer to similar elements.

DETAILED DESCRIPTION

Systems, methods and interfaces for generating painterly pictures are disclosed. While the systems, methods and interfaces of the present disclosure are now described in the context of client-server system, it should be understood that the systems, methods and interfaces can be applied to systems other than a client-server system operably connected over a network where painterly rendering is performed on a single server. For example, a client device, third party servers, social network servers, or media sharing servers may provide some or all of the functionality described herein and may employ a cluster of servers in order to provide such functionality.

Figure 1:
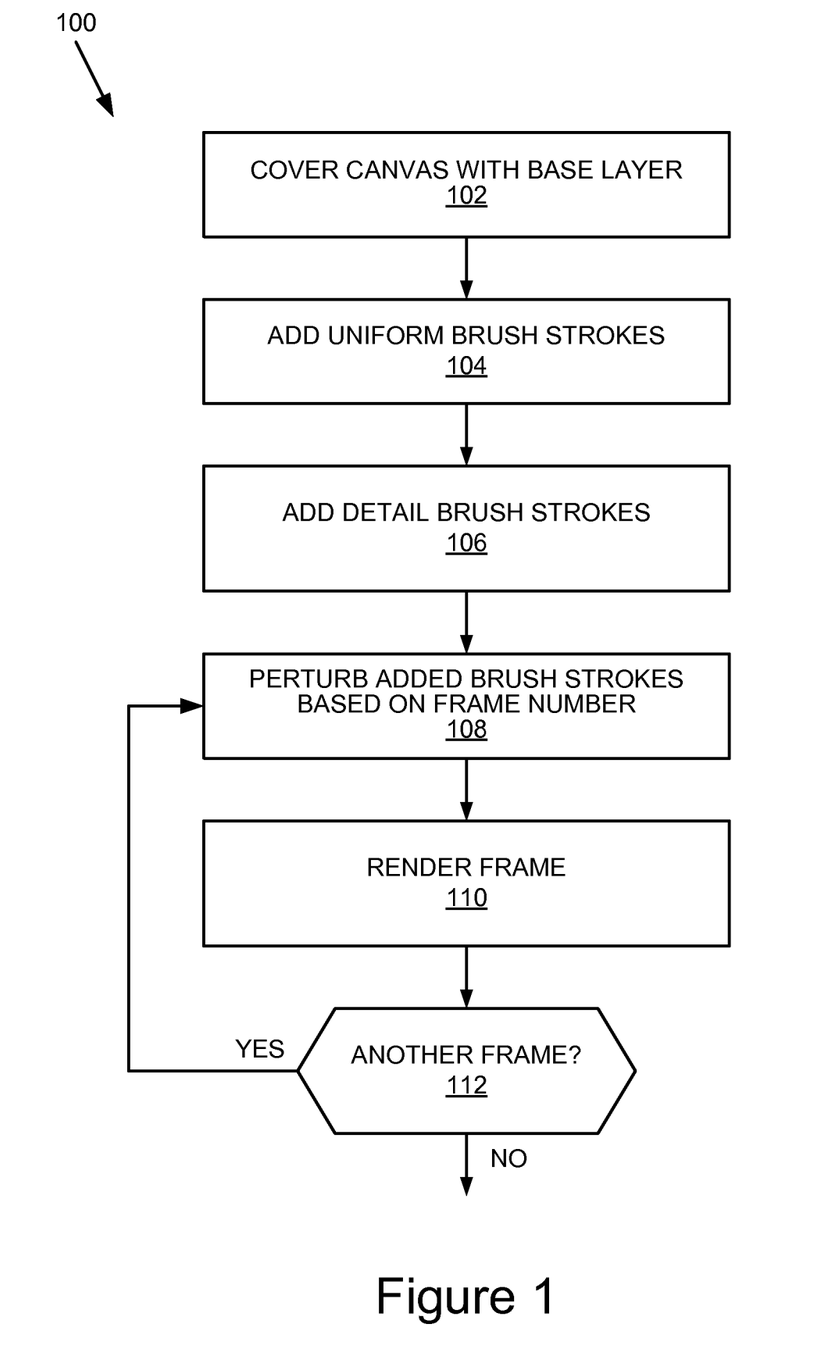
FIG. 1 is a flow chart of an example method for generating painterly animations.

FIG. 1 is a flow chart of an example method for generating painterly animations. The method 100 begins by covering 102 a canvas with a base layer. The base layer is based on an input image. The input image is generally a still photograph, and the method 100 transforms the input image into an animated painterly rendering. Accordingly, the base layer module 816 covers 102 the canvas with a base layer of brush stroke. The base layer of brush strokes are based on a sampling of underlying pixels values in the input image. As discussed further in FIG. 2 and FIGS. 5-8, the base layer module 816 may sample the input image for characteristics including the color scheme of the input image. The brush strokes of the base layer are generally coarse large brush strokes that are well-distributed in a uniform pattern. Moreover, the brush strokes of the base layer may be substantially opaque and may nearly completely cover the canvas on an output image.

Generally the base layer brush strokes are not perturbed as the uniform layer brush strokes and detail layer brush strokes are perturbed as discussed in further detail below. However, in some implementations the base layer brush strokes are perturbed the same way the uniform layer brush strokes and detail layer brush strokes are perturbed.

The brush module 806 may be invoked by the uniform layer module 818 to determine 106 a brush size for the uniform layer. The uniform layer module 818 may make several iterative passes over the input image. In some instances, each subsequent pass over the input image reduces the brush stroke size by about half until a minimum brush size threshold is reached for the uniform layer. Thus, as illustrated in the exemplary block 104, the method 100 adds uniform brush strokes. The method then adds 106 detail brush strokes.

In some cases, the detail layer module 820 adds 106 a detail layer of brush strokes to a priority queue. In some instances, the detail layer brush strokes are based on a determined saliency map. Additionally, similar to the uniform layer of brush strokes, the detail layer brush strokes may be based on a sampling of underlying pixel values in the input image and directionally based on a gradient of the input image.

While the method 100 does not depict an iterative loop over adding base layer, uniform layer and detail layer brush strokes, in some instances, the method 100 may iterate over the input image to create the base layer, the uniform layer and/or the detail layer. Moreover, in some instances, the iterative placement of detailed brush strokes is driven by a saliency map in which iterative passes to the input image create increasingly smaller brush strokes. Further details regarding adding 106 detail brush strokes to are discussed below with reference to FIG. 4.

Brush strokes may be added to a priority queue as described above. Thus, the canvas module 808 may place the brush strokes onto the canvas frame by iterating through the priority queue. In some cases, the priority queue may be used to sort the brush strokes by size prior to placing the brush strokes on the canvas. In alternative implementations, brush strokes may be placed directly on the canvas as they are determined rather than adding the brush strokes to a queue prior to placing the brush strokes on the canvas.

Once all of the brush strokes are placed onto the canvas, the method may iteratively perturb 108 added brush strokes base on a frame number and render the next frame on another canvas frame. Thus, the generated set of frames may be presented as an output multi-frame image or video to the user. In some cases the output may be displayed on a screen within a web browser or may be made available as a file download in a predetermined digital image file format.

The brush strokes are based on two-dimensional vectors. The values of the vectors are perturbed in a continuous and periodic fashion through the set of frames such that the rendered animation is time-coherent. The periodic motion may be based on a sinusoidal function. For example, the periodic motion may be based on a Lissajous curve. In other implementations, the periodic motion may be circular.

Figure 2:
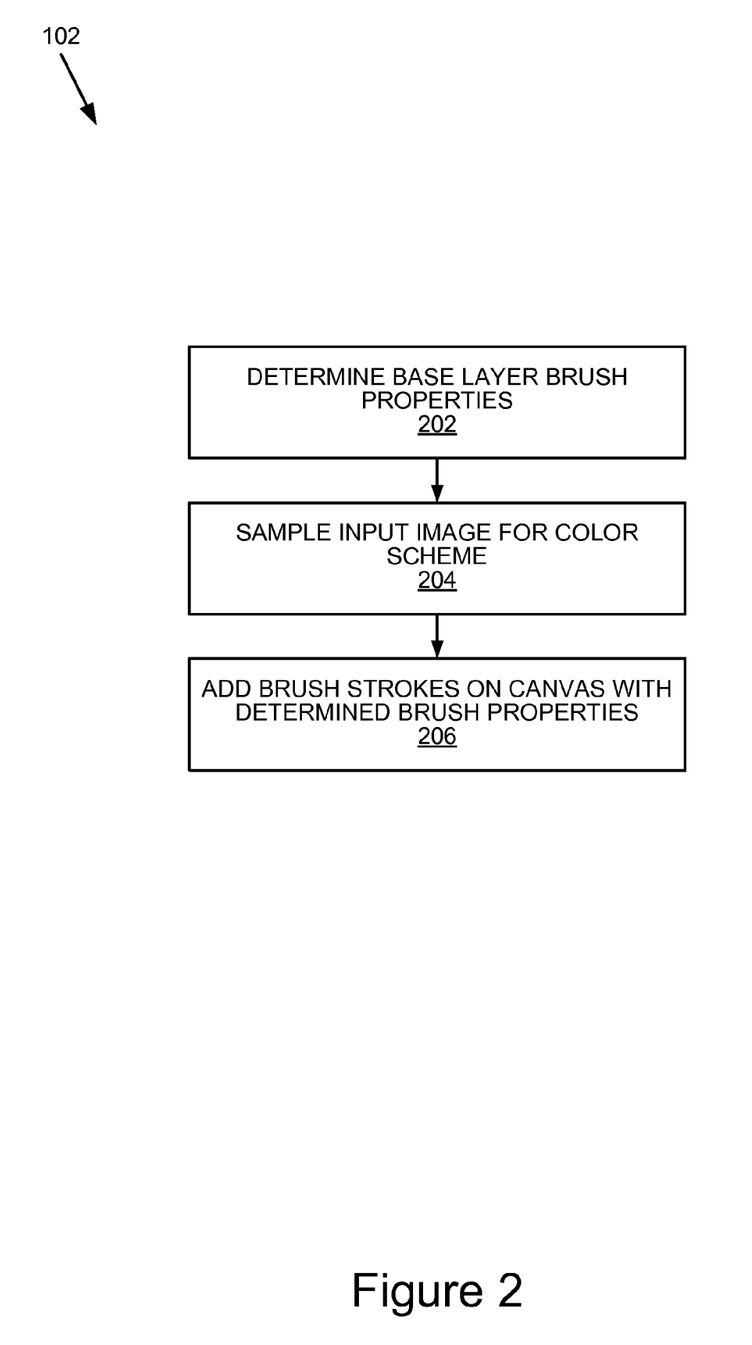
FIG. 2 is a flow chart of an example method for adding a base layer brush strokes.

FIG. 2 is a flow chart of an example method 102 for adding a base layer brush strokes. In particular the method 102 is further detail of the block 102 shown in FIG. 1 where the method 100 adds a base layer of brush strokes to the priority queue. For example, the method 102 determines 202 base layer brush properties. This determination of base layer brush properties may be performed by the base layer module 816 in conjunction with the brush module 806. In some instances the base layer brush properties may be based on the size of the input image, the variation of the underlying color scheme of the input image, the size of the output image, etc. The user interface (UI) module 824 may provide a user interface that allows a user of the painterly rendering module 804 to set or refine values for the base layer brush properties.

The base layer module 816 may then sample 204 the input image for a color scheme and add 206 brush strokes with the determined brush properties. Moreover, the added brush strokes are based on the underlying input image color scheme. The brush strokes of the base layer may generally be large brush strokes that substantially cover the canvas.

Figure 3:
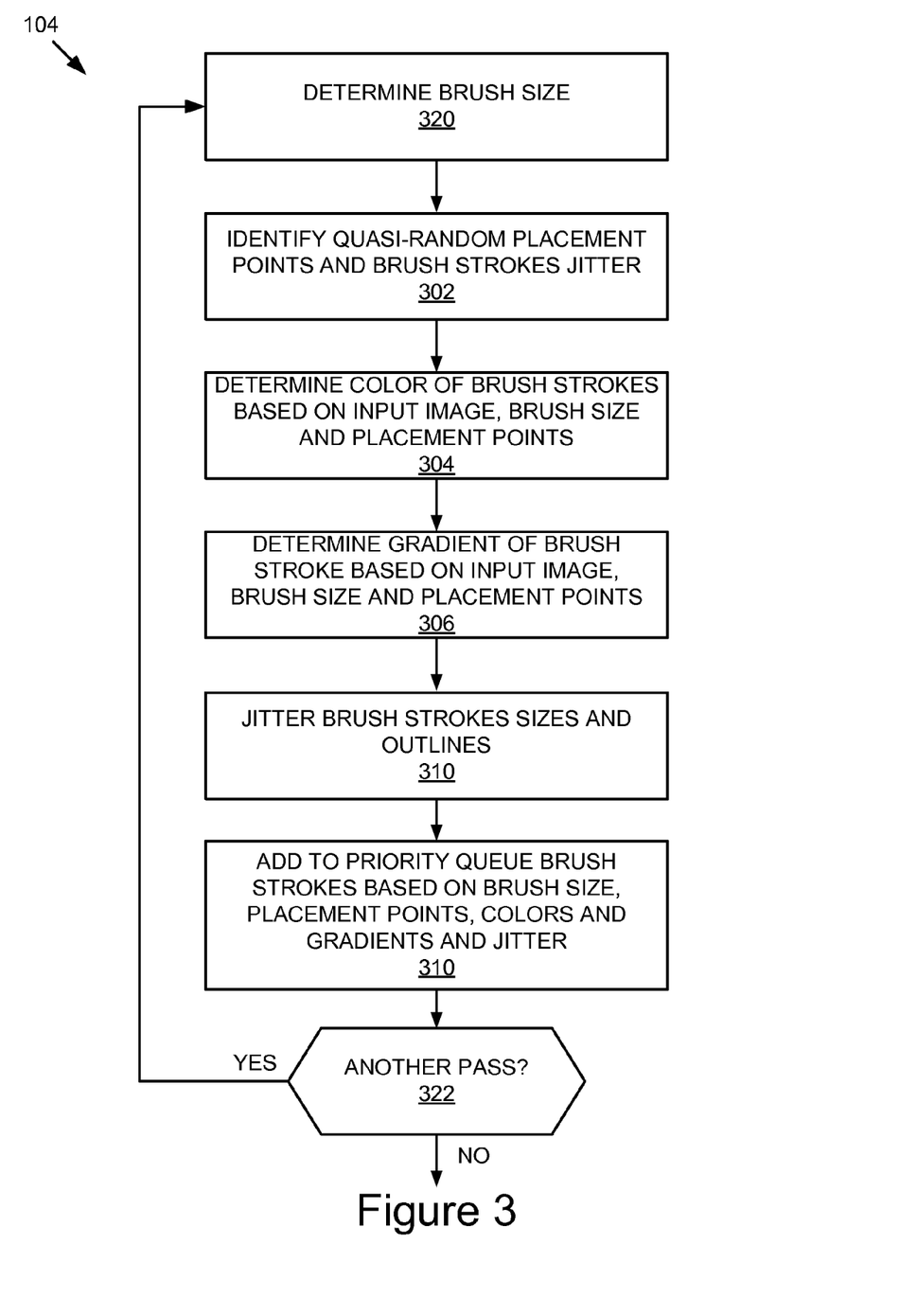
FIG. 3 is a flow chart of an example method for adding uniform layers of brush strokes.

FIG. 3 is a flow chart of an example method 300 for adding uniform layers of brush strokes. The method 300 includes determining 320 a brush size and iteratively passing over the input image by determining 322 whether any further passes are necessary. Brush stroke size in each subsequent iteration may be about half of the brush stroke size of each previous iteration of the uniform layer.

In order to form a uniform layer, the method 300 identifies 302 placement points and brush stroke jitter. Placement of the uniform layer of brush strokes may be based on a random or quasi-random algorithm by employing the randomize module 810.

The color of brush strokes is determined 304 with the sampling module 804. The sampling module 804 may make the color determination based on the input image, brush size and placement point. In one instance, the underlying pixels of the input image are normalized for color and a color is determined based on whether a majority or a plurality pixels have a color. In some instances, a threshold number of normalized pixels need to have a common color or a run-off process occurs where the colors of the underlying pixels are further normalized. This process of re-normalization may repeat until the color of the paint stroke is determined by meeting the threshold number of pixels with a common color. In some instances, the coloration of the brush strokes varies according to its perturbed position. Specifically, pixels of the input image lying within the bounds of the perturbed brush stroke contribute to its color according to some weighting function (i.e., we use a weighted average of some or all pixels within the bounds of the brush stroke). This allows the perturbed brush strokes to adapt to their new surroundings and be realistically woven into the painterly image at each animated frame.

The gradient of the brush strokes is determined 306 with the gradient module 814. The gradient module 814 may generate a gradient image based on the input image that indicates gradients at various points in the input image. The brush strokes' directionality may be based on the gradient determined by the gradient module 814. Thus, in some instances, the gradient module 814 may take into account the brush size and placement point of the brush stroke and return a directionality and amplitude for the brush stroke.

The brush module 806 and/or the randomize module 810 may jitter 308 brush strokes sizes and outlines. By jittering the brush strokes sizes and outlines, the painterly picture may take on a more humanistic feel where an artist generally varies each brush stroke slightly. For example, sizes and outlines of the uniform layer brush strokes may be jittered using a low-discrepancy sequence.

The canvas module 808 adds 310 brush strokes to the priority queue. The brush strokes are generated and added to the priority queue based on brush size, placement point, color, gradient, and jitter. Further details regarding the uniform layer are discussed in particular with reference to FIGS. 5 and 8 below.

Figure 4:
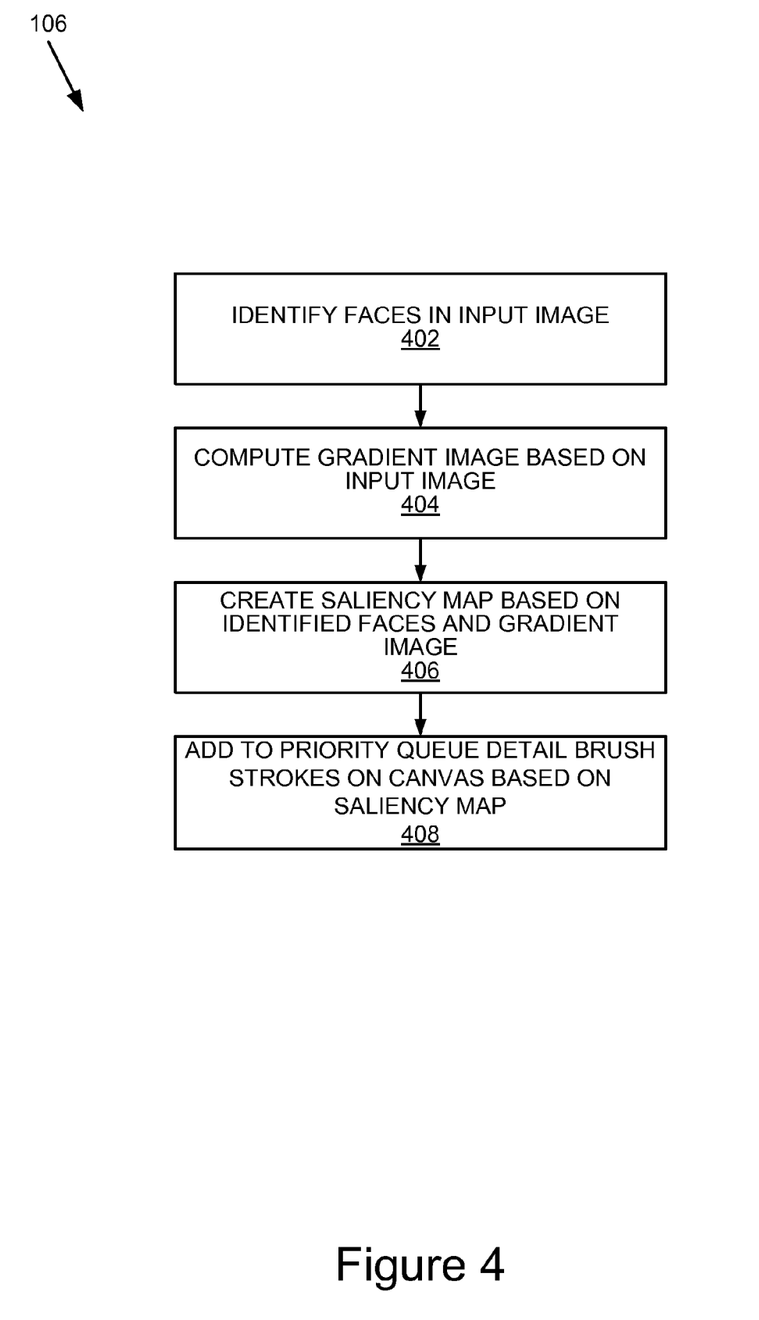
FIG. 4 is a flow chart of an example method for adding detail layers of brush strokes.

FIG. 4 is a flow chart of an example method 106 for adding detail layers of brush strokes. In particular, the method 106 is further detail of the block 106 shown in FIG. 1 where the method 100 adds a detail brush stroke to the priority queue. For example, the method 106 identifies 402 faces in the input image and computes 404 a gradient image based on the input image. The detail layer module 820 and/or the gradient module 814 and/or the saliency module 812 may identify faces in the input image and compute the gradient image.

The saliency module 812 may create 406 a saliency map based on the identified faces and gradient image. The saliency map may be a heat-type map which shows where detailed brush strokes should be placed. The detailed brush strokes are added 408 to the priority queue based on the saliency map. In some cases, the detailed brush strokes may be iteratively added similar to the brush strokes in the uniform layer. However, in general the detailed brush strokes are not uniformly placed. Rather, the detailed brush strokes are placed based on the saliency map. Finer brush strokes may be reserved for areas of higher saliency.

Figure 5:
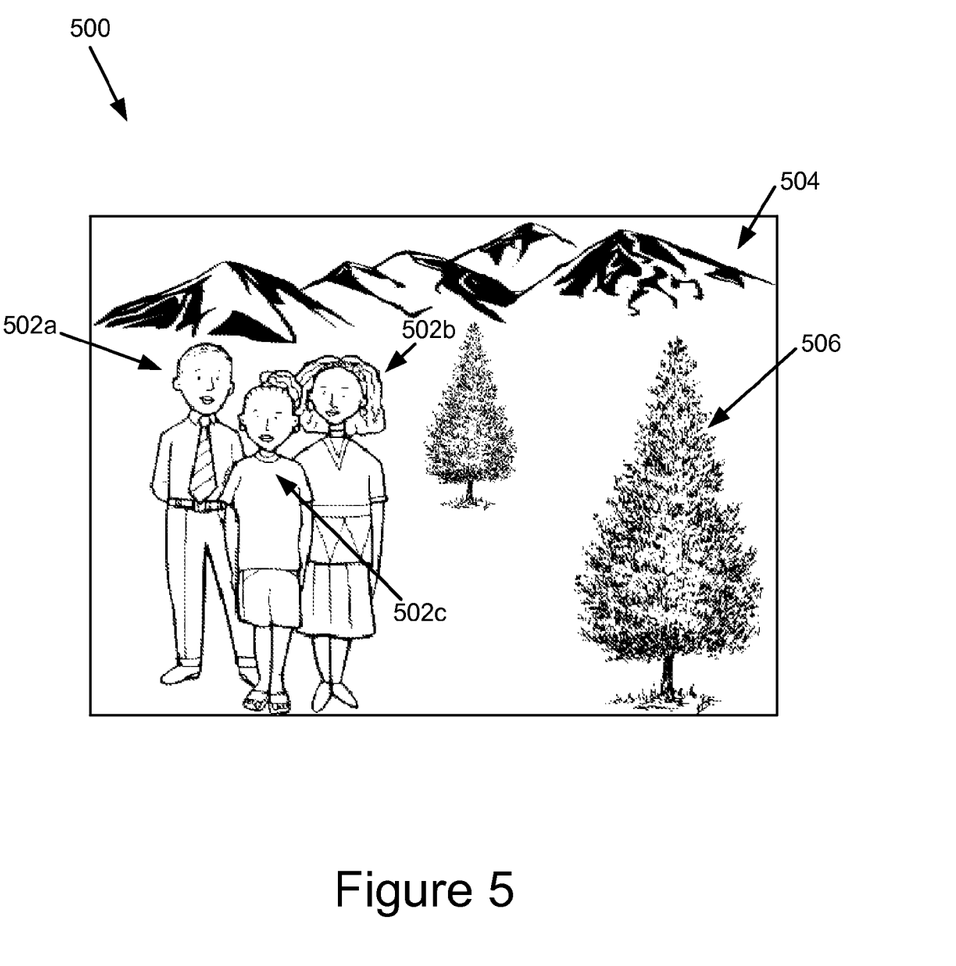
FIG. 5 is a graphic representation of an example input image.

FIG. 5 is a graphic representation of an example input image 500. It should be noted that while in many instances the input image may be a photograph image, the input image 500 is obviously not a photographic image. The input image 500 is a rather simple picture that allows discussion of some of the features of the technology without added distraction. Moreover, the input image 500 simplicity facilitates clearer photocopying on many modern photocopy machines and thus allows duplication of this application as necessary. Nevertheless, the principles discussed herein are applicable to photographic images as well as non-photographic images.

The input image 500 contains a number of faces 502a-c that may be recognized by the saliency module 812 and/or the detail layer module 820. Thus, in processing the input image 500 with the technology, a painterly picture may be rendered that has greater detail in and around the faces 502a-c.

The input image 500 also contains at least one tree 506 and one mountain 504. As depicted in the input image 500, the shaded and unshaded areas of the mountain 504 create a stark contrast of black and white while the tree 506 has many leaves and branches of black and white that tend to be clustered together forming an area of high detail. Thus, the mountain 504 and the tree 506 may be processed by the gradient module 814 differently. Moreover, the gradient module 814 may handle the whitespace of the input image 500 significantly different than either the mountain 504 or the tree 506. In some instances, the whitespaces of the input image 500 may painted with brush strokes that are largely uniform (e.g., uniform layer brush strokes) while the mountain 504, for instance, may be rendered with brush strokes that are directionally placed so that brush stroke sweeps are in the direction of an elongated shadow. Additionally, the tree 506 may be processed as an area of high saliency by the gradient module 814 and/or the saliency module 812.

The combination of the base layer, the uniform layer and the detail layer in the technology renders well-stratified uniform placement of paint over the full canvas with non-uniform placement of paint restricted to regions of high detail. As discussed, the non-uniform placement may generally be guided by the saliency information produced by the saliency module 812. The saliency module 812 may use facial detection on the input image in conjunction with gradient information provided by the gradient module 814. The resultant painterly picture incorporates a high density of fine brush strokes into regions of high stratification along with coarser and more stylized brush strokes elsewhere on the canvas. The technology thereby provides an elegantly efficient solution that can run speedily on a variety of underlying devices. In some cases the technology may generate painterly picture in near real-time and in some cases may be used in a variety of near real-time applications (e.g., video chat, etc.).

The technology may use the same style of importance sampling for populating detailed regions with non-uniform brush strokes. Additionally, uniformly placed brush strokes may be independently generated using a low-discrepancy sequence to produce high stratification with less processing power over the less detailed areas. In some instances, the output painterly picture is rendered by compositing together, in order of decreasing size, numerous simulated brush strokes of semitransparent color, whose sizes and orientations are based on the details of the input image. Brush strokes may incorporate smooth variation of color and opacity and may be slightly randomized. The level of randomization may be adjusted using the UI module 824.

The base layer quickly covers the canvas with a coarse, uniform layer of large, essentially round, and nearly opaque brush strokes without incurring significant computational costs. The base layer brush strokes capture the general color scheme and large-scale features of the input using a small number of strokes, and may prevent the canvas from showing through any gaps left by subsequent layers of brush strokes.

The uniform layer generates varying numbers of evenly spaced semitransparent brush strokes that uniformly cover the canvas. The sizes of the brush strokes may vary over a broad range, typically from a few pixels up to the size of a base layer brush stroke. In some instances the uniform layer occurs in multiple passes. Each pass during the uniform layer may use half the brush size of the previous pass. In some cases, brush sizes may include minor randomization or pseudo-randomization. For example, a low-discrepancy sequence may be used to generate the placement point of the brush strokes and to jitter their relative sizes and outlines. Moreover, a low-discrepancy Halton sequence may allow the brush strokes to be well-stratified. Each brush stroke is colored based on the input pixels it covers, and is elongated and oriented based on gradient vector over the pixels it covers.

The gradient image may be computed with a gaussian blur and a gamma correction of the vector norms. Blurring the gradient vector image may generally spread the influence of edges into surrounding pixels. In this way, the technology may simulate the way a physical paint brush diffuses paint along sharp edges. In some instances, gamma correction may be used to yield more uniform brush stroke lengths.

The detail layer leverages face detection signals and gradient data in conjunction with image based importance sampling in order to vary the size and placement of brush strokes so as to provide finer detail near faces. The resultant painterly picture may have a of higher detail fidelity to the photographic input.

The saliency map may be created such that the saliency map is proportional at each pixel to the per-pixel vector norm of the gradient image. In some instance, facial detection may identify a tight bounding rectangle for each face detected. The tight bounding rectangle may be slightly enlarged and a radial falloff function may be applied to the edge of the bounding rectangle so that that the rectangle interior becomes an ellipse bounded by the rectangle, and falling off toward the edges. The pixel values within the ellipse may serve to scale saliency pixels that were derived from the gradient vector norms, thereby producing a natural shape and falloff for the facial saliency values.

Figure 6:
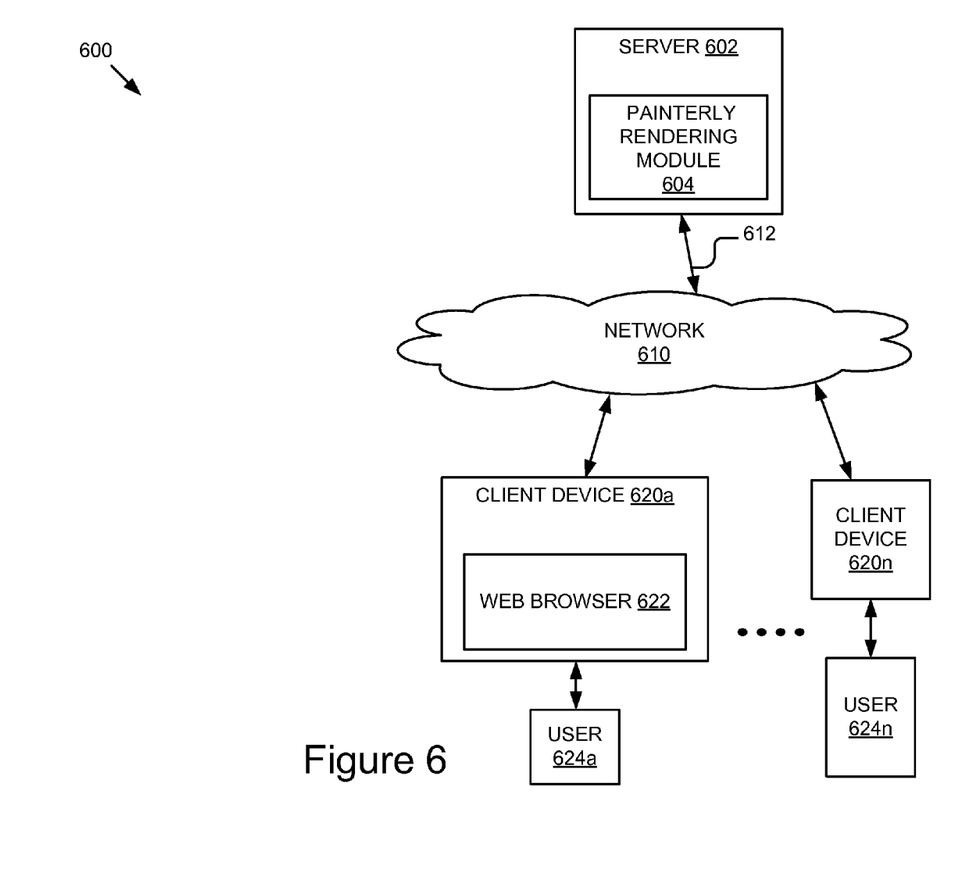
FIG. 6 is a high-level block diagram illustrating an example system for generating painterly animations.

FIG. 6 is a high-level block diagram illustrating an example system 600 for generating painterly pictures. The illustrated system 600 includes client devices 620a-620n (also referred to herein individually and collectively as 620) that are accessed by users 624a-624n (also referred to herein individually and collectively as 624), and a server 602 having a painterly rendering module 604.

The client devices 620a-620n in FIG. 6 are used by way of example. While FIG. 6 illustrates two client devices 620a and 620n, the present disclosure applies to any system architecture having one or more client devices 620. Furthermore, while only one network 610 is coupled to the client devices 620a-620n and the server 602, in practice, one or more networks 604 can be connected to these entities.

While shown as operational on the server 602 in FIG. 6, in some implementations all or part of the painterly rendering module 604 may be operational on the one or more of the client devices 620, server 604 or other servers. The painterly rendering module 604 is also coupled for communication with the client device 620a, which is connected to the network 610. The user 624a interacts with the client device 620a. Similarly, the client device 620n is coupled to the network 610 and the user 624n interacts with the client device 624n. The user 624 is a human user of the client device 620. It should be recognized that the painterly rendering module 604 can be stored in any combination of the devices and servers, or in only one of the devices or servers. The painterly rendering module 604 will be described in more detail with reference to FIGS. 7 and 8.

The client devices 620 can be any computing device including one or more memory and one or more processors, for example, a laptop computer, a desktop computer, a tablet computer, a mobile telephone, a smart phone device, a portable game player, a portable music player, a television with one or more processors embedded therein or coupled thereto, or any other electronic device capable of accessing a network. In some implementations, the system 600 includes a combination of different types of client devices 620. For example, a combination of a personal computer and a mobile phone. As will be described below, it should be understood that the present technologies can operate on different models other than a client-server architecture. For example, the client devices 620 may include the painterly rendering module 604 and include different services.

The browser 622 can be a web browser stored on the client device 620 and configured for two-way communications with the server 604. For example, the browser 622 is a software application for retrieving, presenting and traversing information resources on the web.

The network 610 enables communications between the client devices 620a-n and the server 602. Thus, the network 610 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 610 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 610 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In some implementations, the entities can use custom and/or dedicated data communications technologies instead of, or in addition to, the ones described above. Depending upon the implementation, the network 610 can also include links to other networks.

In some implementations, the network 610 is a partially public or a wholly public network, for example, the Internet. The network 610 can also be a private network or include one or more distinct or logical private networks (e.g., virtual private networks, Wide Area Networks ("WAN") and/or Local Area Networks ("LAN")). Additionally, the communication links to and from the network 610 can be wired or wireless (i.e., terrestrial or satellite-based transceivers). In some implementations, the network 610 is an IP-based wide or metropolitan area network.

The network 610 may have any number of configurations including a star configuration, token ring configuration or other configurations. Furthermore, the network 610 may include a local area network (LAN), a wide area network (WAN) (e.g., the Internet), and/or any other interconnected data path across which multiple devices may communicate. In some implementations, the network 610 may be a peer-to-peer network. The network 610 may also be coupled to or include portions of a telecommunications network for sending data in a variety of different communication protocols. In some implementations, the network 610 includes short-wavelength communication networks or a cellular communications network for sending and receiving data including via short messaging service (SMS), multimedia messaging service (MMS), hypertext transfer protocol (HTTP), direct data connection, wireless application protocol (WAP), electronic messages, etc.

Figure 7:
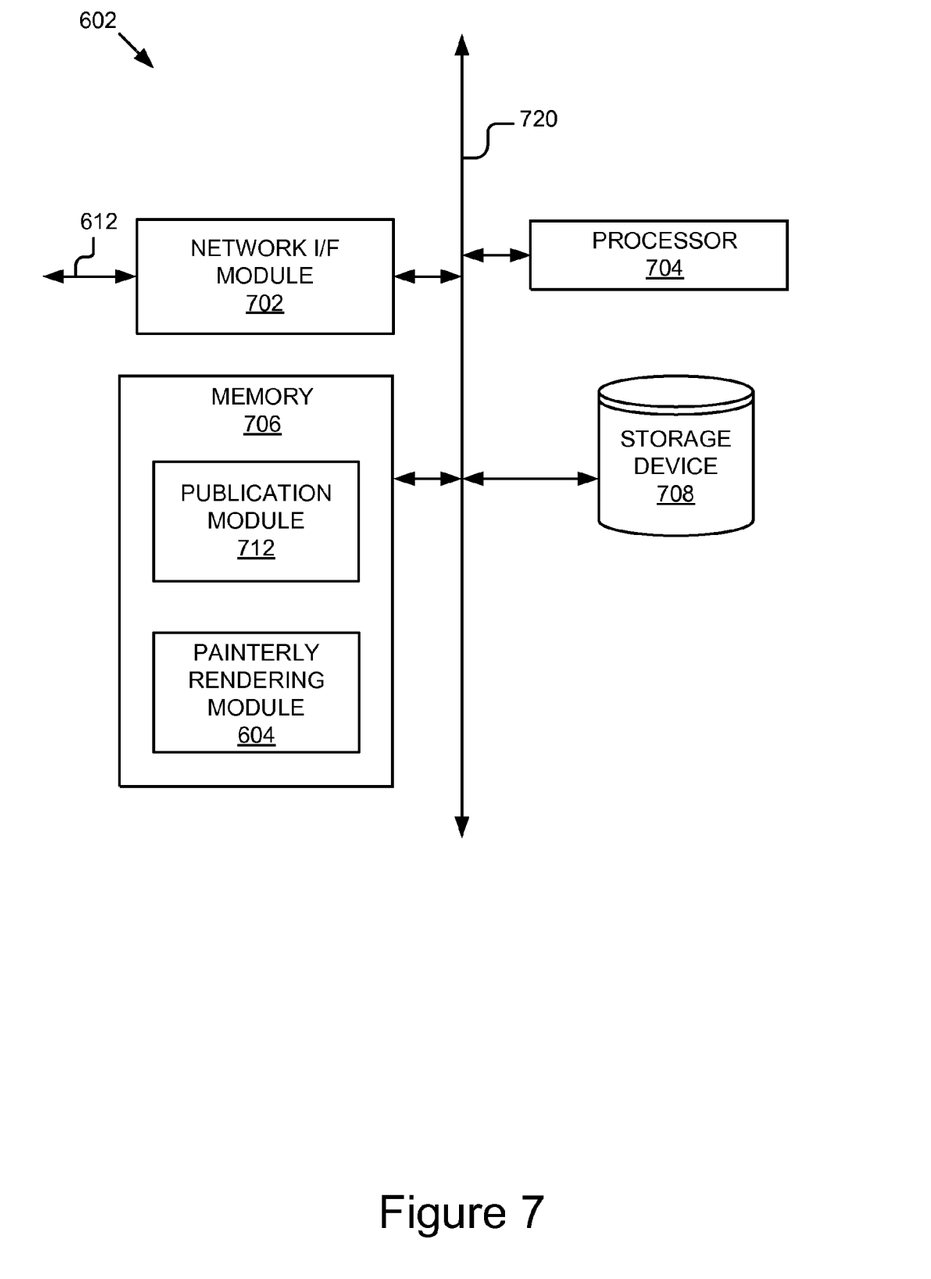
FIG. 7 is a block diagram illustrating an example system including a painterly rendering module.

FIG. 7 is a block diagram illustrating an example system 602 including a painterly rendering module. In the illustrated implementations, the server 602 includes the network interface (I/F) module 702, a processor 704, a memory 706, and a storage device 708. These components of the social network server 602 are communicatively coupled to a bus or software communication mechanism 720 for communication with each other.

The network interface module 702 is coupled to the network 610 by signal line 612. The network interface module 702 is also coupled to the bus 720. The network interface module 702 includes ports for wired connectivity including but not limited to USB, SD, or CAT-5, etc. The network interface module 702 links the processor 704 to the network 610 that may in turn be coupled to other processing systems. The network interface module 702 provides other conventional connections to the network 610 using standard network protocols, e.g., TCP/IP, HTTP, HTTPS and SMTP. In some implementations, the network interface module 1002 includes a transceiver for sending and receiving signals using WiFi, Bluetooth® or cellular communications for wireless communication.

The processor 704 may include an arithmetic logic unit, a microprocessor, a general purpose controller or some other processor array to perform computations and provide electronic display signals to a display device. In some implementations, the processor 704 is a hardware processor. The processor 704 is coupled to the bus 720 for communication with the other components. Processor 704 processes data signals and may include various computing architectures including a complex instruction set computer (CISC) architecture, a reduced instruction set computer (RISC) architecture, or an architecture implementing a combination of instruction sets. Although only a single processor is shown in FIG. 7, multiple processors may be included. It should be understood that other processors, operating systems, sensors, displays and physical configurations are possible.

The memory 706 stores instructions and/or data that may be executed by the processor 704. In the illustrated implementation, the memory 1006 stores the painterly rendering module 604 and the publication module 712. The memory 706 is coupled to the bus 720 for communication with the other components of the social network server 901. The instructions and/or data may include code for performing any and/or all of the techniques described herein. The memory 706 may be a dynamic random access memory (DRAM) device, a static random access memory (SRAM) device, flash memory or some other memory device.

The storage device 708 may be a non-transitory memory that stores data. For example, the storage device 708 may be a dynamic random access memory (DRAM) device, a static random access memory (SRAM) device, flash memory, or some other memory device. In some implementations, the storage device 708 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device. In some implementations, the storage device 708 stores data received from and sent to users 624 to accomplish the functionalities described herein of the painterly rendering module 604.

Software communication mechanism 720 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc.). The software communication mechanism 720 can be implemented on any underlying hardware, for example, a network, the Internet, a bus, a combination thereof, etc.

The publication module 712 can be software or routines for publishing media. In FIG. 7, the publication module 712 is shown as a module operational part of memory 706. In some implementations, the publication module 712 may be part of a social network application. In some implementations, the publication module 712 may be adapted for uploading and providing media and social network metadata to the social network application. In some implementations, the publication module 712 may make media available to client devices 624 connected to the network 610. In some instances, the publication module operates on painterly picture renderings provided by the painterly rendering module 604.

The painterly rendering module 604 is configured to perform a number of functions including: receiving, using one or more processors, an input image; adding, using one or more processors, a base layer of brush strokes based on a sampling of underlying pixel values in the input image, the base layer comprising coarse large brush strokes that are well-distributed in a uniform pattern; adding, using one or more processors, a uniform layer of brush strokes iteratively based on a sampling of underlying pixel values in the input image and directionally based on a gradient of the input image; and adding, using one or more processors, a detail layer of brush strokes based on a determined saliency map. The painterly rendering module 604 includes a number of components as will be described in more detail below with reference to FIG. 8. These components cooperate to provide the functions described above and described in detail herein FIG. 8 is a block diagram illustrating an example painterly rendering module 604. The painterly rendering module 604 includes a communication module 802, a sample module 804, a brush module 806, a canvas module 808, a randomization module 810, a saliency module 812, a gradient module 814, a base layer module 816, a uniform layer module 818, a detail layer module 820, and a UI module 824.

Figure 8:
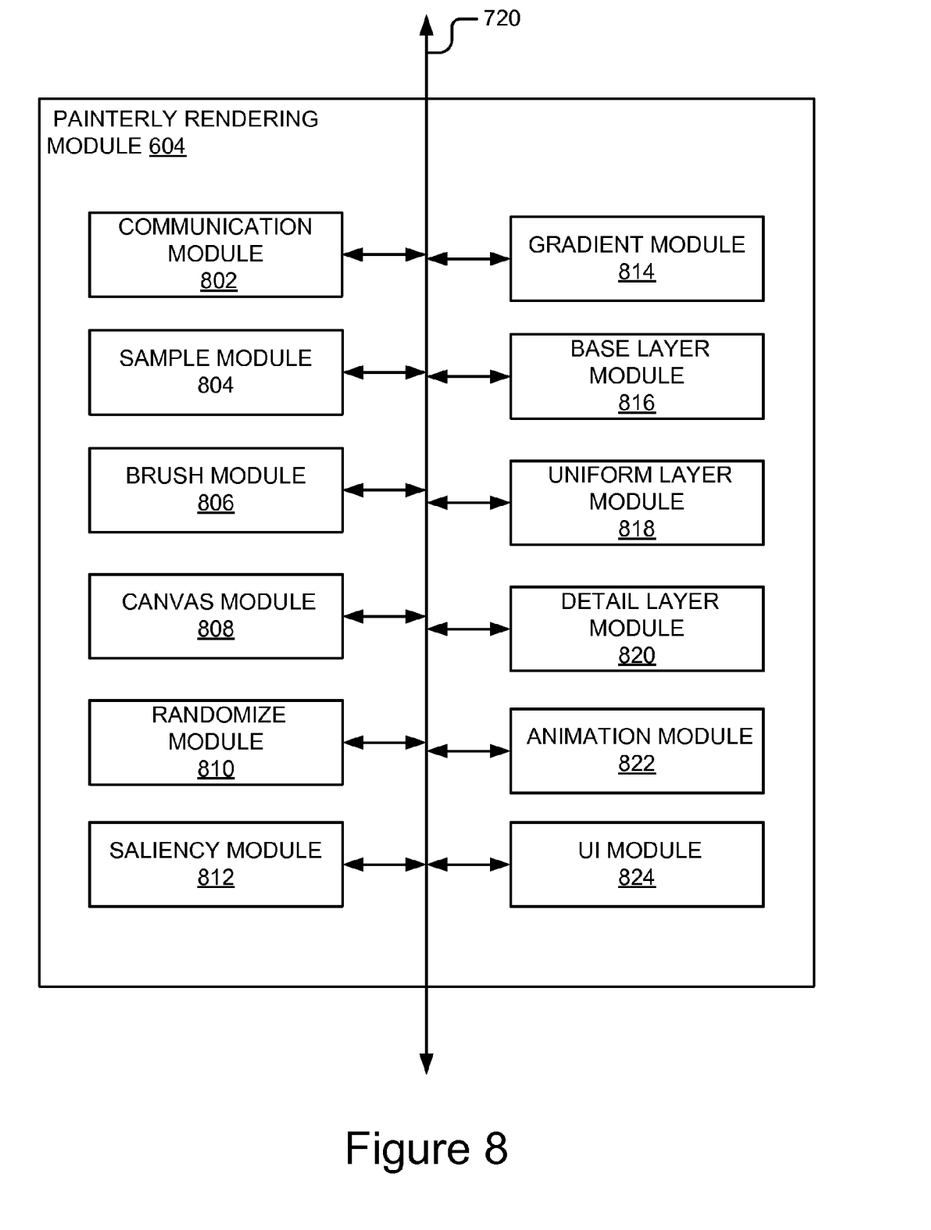
FIG. 8 is a block diagram illustrating an example painterly rendering module.

The communication module 802 can be software or routines for handling communications between the sample module 804, the brush module 806, the canvas module 808, the randomization module 810, the saliency module 812, the gradient module 814, the base layer module 816, the uniform layer module 818, the detail layer module 820, and the UI module 824. The communication module 802 also facilitates communication with the other components of the server 602 as well as communication with the other components of the system 600 via the network interface module 612 and the network 610. For example, the communication module 802 may send signals between servers and the components of the painterly rendering module 604. In some implementations, the communication module 802 is a set of instructions executable by the processor 704. In some implementations, the communication module 802 is stored in the memory 706 of the server 602 and is accessible and executable by the processor 704. In some implementations, the communication module 802 is adapted for cooperation and communication with the processor 704, the memory 706 and other components of the painterly rendering module 604 via the bus 720.

The sample module 804 can be software or routines for sampling an input image. For example, the sample module 804 may scan the input image in a specified region to determine the color of a brush stroke. The sample module 804 may also provide scanned data to the saliency module 812 and/or the gradient module 814 to generate gradient images and saliency maps. In some implementations, the sample module 804 is a set of instructions executable by the processor 704. In some implementations, the sample module 804 is stored in the memory 706 of the server 602 and is accessible and executable by the processor 704. In some implementations, the sample module 804 is adapted for cooperation and communication with the processor 704, the memory 706 and other components of the painterly rendering module 604 via the bus 720.

The brush module 806 can be software or routines for managing brush properties. The brush module 806 is coupled to receive from the base layer module 816, uniform layer module 818, and the detail layer module 820 request for brush strokes with particular properties. In some implementation the brush module 806 may communicate with the randomize module to randomize brush strokes and may further communicate with canvas module 808 to place brush strokes on the canvas and/or add brush strokes to the priority queue and placed on the canvas at a later time. The brush module 806 may also invoke functionality within the gradient module 814 and/or saliency module 812 in passing brush strokes to the canvas module 808. In some implementations, the brush module 806 is a set of instructions executable by the processor 704. In some implementations, the brush module 806 is stored in the memory 706 of the server 602 and is accessible and executable by the processor 704. In some implementations, the brush module 806 is adapted for cooperation and communication with the processor 704, the memory 706 and other components of the painterly rendering module 604 via the bus 720.

The canvas module 808 can be software or routines for using a priority queue (if any) to sort the brush strokes by size, placing brush strokes on a canvas, and presenting the canvas to the user as output. The sorting may be performed so that the largest brush strokes are placed on the canvas first and the smallest, most detailed brush strokes are placed on the canvas last. In some implementations, the canvas module 808 is a set of instructions executable by the processor 704. In some implementations, the canvas module 808 is stored in the memory 706 of the server 602 and is accessible and executable by the processor 704. In some implementations, the canvas module 808 is adapted for cooperation and communication with the processor 704, the memory 706 and other components of the painterly rendering module 604 via the bus 720.

The randomization module 810 can be software or routines for randomizing or pseudo-randomizing functionality in the painterly rendering module 604. For example, the randomization module 810 may be used to determine placement of uniform layer and/or detail layer brush strokes. Moreover, the randomization module 810 may be user to jitter brush stroke sizes and outlines. In some implementation, a low-discrepancy sequence may be used within the randomization module 810 (for example, a low-discrepancy Halton sequence). In some implementations, the randomization module 810 is a set of instructions executable by the processor 704. In some implementations, the randomization module 810 is stored in the memory 706 of the server 602 and is accessible and executable by the processor 704. In some implementations, the randomization module 810 is adapted for cooperation and communication with the processor 704, the memory 706 and other components of the painterly rendering module 604 via the bus 720.

The saliency module 812 can be software or routines for detecting and maintain salient details in an input image. The saliency module 812 can provide facial detection functionality on an input image and create a saliency map with the facial detection information and information received from the gradient module 814. In some implementations, the saliency module 812 is a set of instructions executable by the processor 704. In some implementations, the saliency module 812 is stored in the memory 706 of the server 602 and is accessible and executable by the processor 704. In some implementations, the saliency module 812 is adapted for cooperation and communication with the processor 704, the memory 706 and other components of the painterly rendering module 604 via the bus 720.

The gradient module 814 can be software or routines for computing a gradient image. More specifically, the gradient module 814 may receive a request from the uniform layer module 818 and/or the detail layer module 820 so that the painter rendering module 604 may place the brush strokes in the canvas module 808 with the correct directionality and amplitude. In some implementations, the gradient module 814 is a set of instructions executable by the processor 704. In some implementations, the gradient module 814 is stored in the memory 706 of the server 602 and is accessible and executable by the processor 704. In some implementations, the gradient module 814 is adapted for cooperation and communication with the processor 704, the memory 706 and other components of the painterly rendering module 604 via the bus 720.

The base layer module 816 can be software or routines for placing brush strokes in the canvas module 808 for the base layer. In some implementations, the base layer module 816 is a set of instructions executable by the processor 704. In some implementations, the base layer module 816 is stored in the memory 706 of the server 602 and is accessible and executable by the processor 704. In some implementations, the base layer module 816 is adapted for cooperation and communication with the processor 704, the memory 706 and other components of the painterly rendering module 604 via the bus 720.

The uniform layer module 818 can be software or routines for placing brush strokes in the canvas module 808 for the uniform layer. In some implementations, the uniform layer module 818 is a set of instructions executable by the processor 704. In some implementations, the uniform layer module 818 is stored in the memory 706 of the server 602 and is accessible and executable by the processor 704. In some implementations, the uniform layer module 818 is adapted for cooperation and communication with the processor 704, the memory 706 and other components of the painterly rendering module 604 via the bus 720.

The detail layer module 820 can be software or routines for placing brush strokes in the canvas module 808 for the detail layer. In some implementations, the detail layer module 820 is a set of instructions executable by the processor 704. In some implementations, the detail layer module 820 is stored in the memory 706 of the server 602 and is accessible and executable by the processor 704. In some implementations, the detail layer module 820 is adapted for cooperation and communication with the processor 704, the memory 706 and other components of the painterly rendering module 604 via the bus 720.

The animation module 822 can be software or routines for iteratively perturbing added brush strokes to generate subsequent frames. The animation module 822 also may combine the set of generated frames into an animation. In some implementations the animation may be saved as a multi-frame image (e.g., an animated GIF file) or may be saved as a video. In some implementations, the animation module 822 is a set of instructions executable by the processor 704. In some implementations, the animation module 822 is stored in the memory 706 of the server 602 and is accessible and executable by the processor 704. In some implementations, the animation module 822 is adapted for cooperation and communication with the processor 704, the memory 706 and other components of the painterly rendering module 604 via the bus 720.

The UI module 824 can be software or routines for generating a user interface element. The UI module 824 also may receive input images and present a rendering painterly picture for to the user. The UI module 824 may also allow the user to adjust or tweak variables to the functionality described above. For example, brush stroke properties and thresholds may be set using the UI module 824. In some implementations, the UI module 824 is a set of instructions executable by the processor 704. In some implementations, the UI module 824 is stored in the memory 706 of the server 602 and is accessible and executable by the processor 704. In some implementations, the UI module 824 is adapted for cooperation and communication with the processor 704, the memory 706 and other components of the painterly rendering module 604 via the bus 720.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing," "computing," "calculating," "determining," or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions and/or formats. Furthermore, the modules, routines, features, attributes, methodologies, and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
determining, using one or more processors, a first set of brush strokes, each brush stroke being based on a two-dimensional vector;
generating, using one or more processors, a first frame from the first set of brush strokes, the first set of brush strokes being formed from a placement of a uniform layer and a detail layer on a canvas, the uniform layer being based on a sampling of underlying pixel values in an input image, and the detail layer being based on a saliency map determined from the input image;
automatically perturbing, using one or more processors, the first set of brush strokes to create additional sets of brush strokes; and
generating, using one or more processors, additional frames from the additional sets of brush strokes, wherein the first frame and the additional frames form a sequence of frames that are time-coherent.

2. The method of claim 1, wherein the saliency map is based on areas of the input image in which one or more faces are recognized.

3. The method of claim 1, wherein the saliency map is based on a gradient image of the input image.

4. The method of claim 1, wherein the perturbations of the brush strokes in the generated sequence of frames form a periodic motion.

5. The method of claim 4, wherein the periodic motion is based on a sinusoidal function.

6. The method of claim 4, wherein the periodic motion is based on a Lissajous curve.

7. The method of claim 1, wherein placement of the uniform layer of brush strokes are based on a random or quasi-random algorithm.

8. The method of claim 1, wherein sizes and outlines of the uniform layer brush strokes are jittered using a low-discrepancy sequence.

9. The method of claim 1, wherein the first set of brush strokes are added to a priority queue, and the method further comprises:

sorting, using one or more processors, the priority queue; and
placing, using one or more processors, the first set of brush strokes in the priority queue on the canvas.

10. A computer program product comprising a non-transitory computer usable medium including a computer readable program, wherein the computer readable program when executed on a computer causes the computer to:
determine a first set of brush strokes, each brush stroke being based on a two-dimensional vector;
generate a first frame from the first set of brush strokes, the first set of brush strokes being formed from a placement of a uniform layer and a detail layer on a canvas, the uniform layer being based on a sampling of underlying pixel values in an input image, and the detail layer being based on a saliency map determined from the input image;
automatically perturb the first set of brush strokes to create additional sets of brush strokes; and
generate additional frames from the additional sets of brush strokes, wherein the first frame, and the additional frames form a sequence of frames that are time-coherent.

11. The computer program product of claim 10, wherein the saliency map is based on areas of the input image in which one or more faces are recognized.

12. The computer program product of claim 10, wherein the saliency map is based on a gradient image of the input image.

13. A system comprising:
a processor; and
a memory storing instructions that, when executed, cause the system to:
determine a first set of brush strokes, each brush stroke being based on a two-dimensional vector;
generate a first frame from the first set of brush strokes, the first set of brush strokes being formed from a placement of a uniform layer and a detail layer on a canvas, the uniform layer being based on a sampling of underlying pixel values in an input image, and the detail layer being based on a saliency map determined from the input image;
automatically perturb the first set of brush strokes to create additional sets of brush strokes; and
generate additional frames from the additional sets of brush strokes, wherein the first frame, and the additional frames form a sequence of frames that are time-coherent.

14. The system of claim 13, wherein the saliency map is based on areas of the input image in which one or more faces are recognized.

15. The system of claim 13, wherein the saliency map is based on a gradient image of the input image.

16. The system of claim 13, wherein the perturbations of the brush strokes in the generated sequence of frames form a periodic motion.

17. The system of claim 16, wherein the periodic motion is based on a sinusoidal function.

18. The system of claim 16, wherein the periodic motion is based on a Lissajous curve.

* * * * *